US010342737B1

(12) United States Patent
Shanmugavelayudam et al.

(10) Patent No.: US 10,342,737 B1
(45) Date of Patent: Jul. 9, 2019

(54) ACTIVE MONITORING SYSTEM FOR THERMALLY-MANAGED TRANSPORTATION AND STORAGE OF SPECIFIC PERISHABLE PRODUCTS

(71) Applicant: MaxQ Research LLC, Stillwater, OK (US)

(72) Inventors: Saravan Kumar Shanmugavelayudam, Stillwater, OK (US); Shoaib Shaikh, Stillwater, OK (US); Balaji Jayakumar, Stillwater, OK (US); Arif Rahman, Stillwater, OK (US); Trung Dang Nguyen, Stillwater, OK (US)

(73) Assignee: MaxQ Research LLC, Stillwater, OK (US)

( * ) Notice: Subject to any disclaimer, the term of this patent is extended or adjusted under 35 U.S.C. 154(b) by 0 days.

(21) Appl. No.: 15/933,055

(22) Filed: Mar. 22, 2018

(51) Int. Cl.
*G08B 17/00* (2006.01)
*A61J 1/16* (2006.01)
(Continued)

(52) U.S. Cl.
CPC .......... *A61J 1/165* (2013.01); *B65D 81/3823* (2013.01); *B65D 81/3827* (2013.01);
(Continued)

(58) Field of Classification Search
CPC . A61J 1/165; B65D 81/3823; B65D 81/3827; F25D 29/005; F25D 2101/00;
(Continued)

(56) References Cited

U.S. PATENT DOCUMENTS 5,586,438 A * 12/1996 Fahy .......................... A01N 1/02
435/284.1
6,028,293 A 2/2000 Nagle et al.
(Continued)

FOREIGN PATENT DOCUMENTS

EP 1420573 A1 5/2004

OTHER PUBLICATIONS

MaxQ Research; "Blood Cooler Storage + Transport"; retrieved on Mar. 7, 2018 from http://packmaxq.com/blood-packaging.
(Continued)

*Primary Examiner* — Quang Pham
(74) *Attorney, Agent, or Firm* — Robert H. Frantz

(57) ABSTRACT

A shipping and storage system which has an access panel with an optional open/close status sensor, and a payload carrier with an affixed sensor connected to a tracking module that monitors the environment of the payload carrier, such as temperature, against a pre-determined threshold for compliance with pre-determined handling and storage requirements for a specific payload type, such as a specific blood product. When a violation is detected by the tracking module, a user alert or user interface is activated. Advanced features optionally include a plurality of pre-determined threshold sets for a plurality of specific payload types, a tamper detection function based on the access panel status and optional weight changes in the payload carrier, and wireless connectivity to allow mobile device and cloud-based enhanced management functions.

33 Claims, 9 Drawing Sheets

(51) Int. Cl.
*B65D 81/38* (2006.01)
*F25D 29/00* (2006.01)

(52) U.S. Cl.
CPC ......... *F25D 29/005* (2013.01); *F25D 29/008* (2013.01); *B65D 2101/00* (2013.01); *F25D 2331/8014* (2013.01); *F25D 2700/02* (2013.01); *F25D 2700/16* (2013.01)

(58) Field of Classification Search
CPC ......... F25D 2331/8014; F25D 2700/02; F25D 2700/16
See application file for complete search history.

(56) References Cited

U.S. PATENT DOCUMENTS 6,482,332 B1 11/2002 Malach
6,673,594 B1 * 1/2004 Owen ...................... A01N 1/02 435/284.1
7,908,870 B2 * 3/2011 Williams .................. F25D 3/08 62/530
9,027,782 B1 5/2015 Shanmugavelayudam et al.
9,751,682 B2 9/2017 Mayer et al.
9,798,994 B2 10/2017 Mayer
2002/0099567 A1 7/2002 Joao
2004/0151851 A1 8/2004 Miller
2006/0276768 A1 * 12/2006 Miller ..................... A61J 1/165 604/403
2007/0028642 A1 * 2/2007 Glade .................... A45C 11/20 62/371
2007/0032774 A1 * 2/2007 Glade ..................... A61J 1/165 604/403
2008/0135564 A1 * 6/2008 Romero ............. B65D 81/3827 220/592.2
2009/0261549 A1 * 10/2009 Kral ....................... A61G 15/14 280/47.35
2009/0282192 A1 * 11/2009 Maus ................... G06Q 20/105 711/115
2010/0028850 A1 * 2/2010 Brassil ..................... A01N 1/02 435/1.2
2011/0017831 A1 * 1/2011 Picon ............... G06K 19/07749 235/488
2011/0082437 A1 * 4/2011 Stacey .................... F25D 15/00 604/404
2012/0046792 A1 * 2/2012 Secor ....................... F24F 11/30 700/276
2012/0197810 A1 * 8/2012 Haarmann ......... G06Q 10/0832 705/302
2012/0281101 A1 * 11/2012 Fujinawa ........... H04N 1/00127 348/207.1
2013/0289927 A1 10/2013 Smith et al.
2014/0350720 A1 * 11/2014 Lehmann ............ G06F 19/3462 700/236
2015/0192475 A1 * 7/2015 Eisenstadt ................ G01K 1/02 340/870.17
2015/0241120 A1 8/2015 Mayer
2015/0310174 A1 * 10/2015 Coudert .............. G06F 21/6245 705/3
2016/0232877 A1 * 8/2016 Cho ....................... F25D 29/005
2016/0306636 A1 * 10/2016 Nguyen ................ G06F 9/4403
2017/0056289 A1 * 3/2017 Tsuno ..................... A61J 1/165

OTHER PUBLICATIONS

MaxQ Research; "Donor Tub Shipper", retrieved on Mar. 7, 2018 from http://packmaxq.com/blood-packaging.
MaxQ Research; "Platelet Shipper", retrieved on Mar. 7, 2018 from http://packmaxq.com/blood-packaging.
MaxQ Research; "Red Blood Cell Shipper", retrieved on Mar. 7, 2018 from http://packmaxq.com/blood-packaging.
MaxQ Research; "Improving the Blood Supply Chain with Advanced Shipping and Storage Materials", published online Oct. 2017.
MaxQ Research; "Package design, testing & evaluation", retrieved on Mar. 7, 2018 from http://packmaxq.com/blood-packaging.
Fadeyi, et al.; "Implementaiton of a new blood carrier cooler insert and tracking technology with educational initiatives and its effect on reducing red blood cell wastage"; vol. 57, Oct. 2017, Transfusion, pp. 2477-2482.
TempTime; Cooler validation survey results—Mar. 2012; retrieved on Mar. 21, 2018 from http://williamlabs.com/aabb-topics-guidelines/cooler-validation-survey-results-march-2012/.
Coolpac; "Blood Transport & Validated Temperature Controlled Packaging", retrieved on Feb. 19, 2018 from http://coolpac.com.
Omega; "Temperature monitoring during transportation, storage and processing of perishable products"; retrieved on Feb. 19, 2018 from https://www.omega.com.
Badia-Melis, et al.; "Refrigerated fruit storage monitoring combining two different wireless sensing technologies: RFID and WSN", Sensors, 2015, vol. 15, pp. 4781-4795.
Pelican Biothermal; "Glossary", retrieved from http://pelicanbiothermal.com on Feb. 19, 2018.
Pelican Biothermal; "Blood Supplies", retrieved from http://pelicanbiothermal.com on Feb. 19, 2018.
Polar Tech; "Insulated shipping kit, . . . ", retrieved from https://www.grainger.com on Feb. 19, 2018.
True Pack; "Blood Shippers", retrieved on Feb. 19, 2018 from http://www.truepack.com.
Swedberg, Claire; "Wake Forest Baptist develops system for tracking blood temperature", RFID Journal, 2011.
Tech Instrumentation; "TRIX-8 Data Logger", retrieved on Feb. 19, 2018 from http://techinstrument.com.

* cited by examiner

Blood Storage and Transportation Requirements

| Blood Product | Condition | Temperature Range | Transport/ Storage Time | Transport/ Storage Equipment |
|---|---|---|---|---|
| **Whole blood and packed red cell** | For transport to another center (steps 202, 204) | +1 °C to +10 °C | Depends on qualified duration of the container | Qualified container having sufficient cooling materials |
| **Whole blood and packed red cell** | For storage in blood center (steps 203, 205) | +1 °C to +6 °C | 35 days | Blood bank / Hospital refrigerator |
| **Platelet concentrates** | For transportation to another center (step 204) | +20 °C to +24 °C | 24 hours (maximum time without agitation) | Qualified container having sufficient temperature stabilization materials |
| **Platelet concentrates** | For storage in blood center (steps 203, 205) | +20 °C to +24 °C | 5 to 7 days | Platelet incubator with agitator |
| **Fresh frozen plasma** | For storage in blood center (steps 203, 205) | Frozen state (below −18 °C) | 12 months from collection | Plasma freezer |
| **Fresh frozen plasma** | For transport to another center (step 204) | Frozen state | Transported until mainteined in frozen state | Qualified container having sufficient cooling materials |
| **Packed red cells, thawed plasma** | Blood components issued for transfusion (step 206) | +1 °C to +6 °C | Depends on qualified storage duration of the cooler | Portable coolers |

Sources: AABB, WHO

Fig. 3

ACTIVE MONITORING SYSTEM FOR THERMALLY-MANAGED TRANSPORTATION AND STORAGE OF SPECIFIC PERISHABLE PRODUCTS

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

None.

MICROFICHE APPENDIX

Not applicable.

INCORPORATION BY REFERENCE

None.

FIELD OF THE INVENTION

The invention generally relates to condition monitoring, reporting, and automated remedial actions for the transport of perishable materials such as blood, tissue, organs, biologics, pharmaceuticals, specimens, foods, and chemicals.

BACKGROUND OF INVENTION

Blood and blood products must go through a series of steps before they are transfused into the patient. This is known as the "blood transfusion supply chain", which may be defined as a temperature-controlled supply chain. At each step in the blood supply chain, precise temperatures must be maintained to ensure the integrity of the blood products. If the blood or blood product (e.g., component) is allowed to become too cold or too warm, then the blood products may become unusable. Other perishable products, such as tissues, organs, biological samples, food and food components, and certain chemicals share similar requirements to maintain temperature within a certain range during storage and transport.

SUMMARY OF THE INVENTION

An improved shipping and storage system is disclosed which has an access panel with an optional open/close status sensor, and a payload carrier with an affixed sensor connected to a tracking module that monitors the environment of the payload carrier, such as temperature, against a pre-determined threshold for compliance with pre-determined handling and storage requirements for a specific payload type, such as a specific blood product. When a violation is detected by the tracking module, a user alert or user interface is activated. Advanced features optionally include a plurality of pre-determined threshold sets for a plurality of specific payload types, a tamper detection function based on the access panel status and optional weight changes in the payload carrier, and wireless connectivity to allow mobile device and cloud-based enhanced management functions.

BRIEF DESCRIPTION OF THE DRAWINGS

The description set forth herein is illustrated by the several drawings.

FIG. 3 sets forth an exemplary set of pre-determined storage and handling thresholds (temperature, accrued time, etc.) for a plurality of specific payload types (blood products) for encoded into one or more computer-readable memory devices according to at least one embodiment of the present invention.

DETAILED DESCRIPTION OF EMBODIMENT(S) OF THE INVENTION

The inventors of the present invention have recognized a problem not yet recognized or solved by those skilled in the relevant arts. Blood banks, diagnostic labs, and hospitals often use blood transport and storage systems, containers, and enclosures that may not have been designed or ideally suited for that purpose. This creates inefficiencies in handling, and requires time-consuming validation to remain compliant with regulations. Blood products are costly, and any spoilage can cause shortages and put human lives at risk. And any avoidable losses affect the financial results for the blood banks and hospitals handling those products. The inventors have recognized that a more reliable, cost-effective solution for transporting blood products is needed. The present invention provides certain technological improvements for this purpose.

Figure 2:
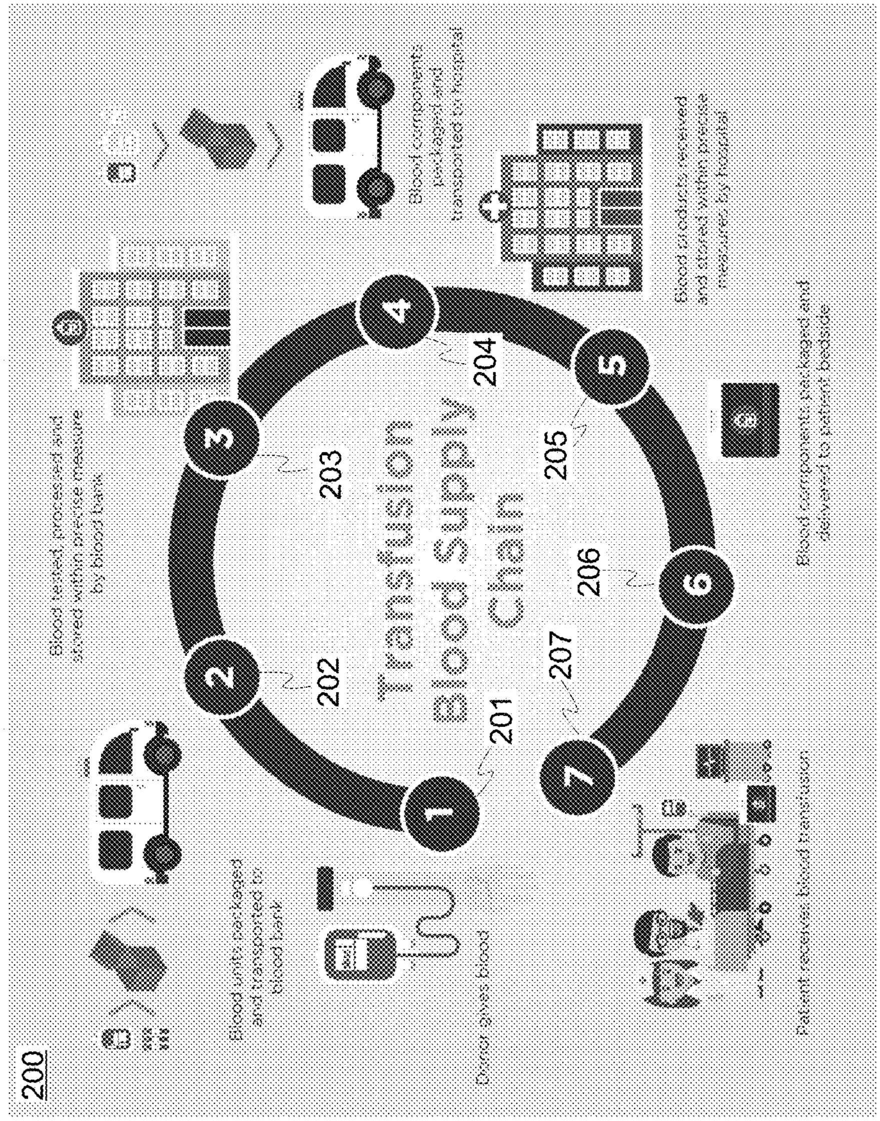
FIG. 2 depicts a typical blood supply chain.

The inventors have realized that the modern blood supply chain includes at least seven (7) points of failure where any delays, miscommunications, or procedural issues can cause serious problems with the quality and usability of the blood product. As shown in FIG. 2, steps in the modern blood supply chain (200) typically include, but are not limited to:

(201) The donor gives blood.

(202) After donation, blood units and donor blood specimens are placed into storage containers and transported to the blood bank which may be many miles away.

(203) At the blood bank, the blood is tested, processed, and stored according to precise specifications determined by the blood bank in compliance with corporate, state, national, international and/or association standards, such as the standards promulgated by the American Association of Blood Banks (AABB) in the United States.

(204) When ordered, blood products are again placed within cold storage containers and transported to the hospital or other location where blood is needed.

(205) When received by the hospital, the blood products are again stored according to precise specifications determined by the hospital in compliance with the relevant storage and handling standards.

(206) When ordered by the physician, blood products are packaged and delivered to the patient's bedside.

(207) Finally, the blood is transfused into the patient as needed, over a period of time, during which time additional units of blood may be stored next to the patient's bed while the patient receives a unit via transfusion.

Each of these seven generalized steps represents a possible point of failure where any delays, miscommunications, or procedural issues can cause serious problems. Further, some units of blood or blood components may be returned to the blood bank, such as when the patient no longer requires the blood products. However, return and restocking of blood products requires a number of conditions to be met by most handling and storage standards:

(a) The container closure has not been disturbed.

(b) The appropriate temperature range has been maintained.

(c) For red blood cell components, at least one sealed segment of integral donor tubing has remained attached to the bag. Removed segments shall be reattached only after confirming that the tubing identification numbers on both the removed segment(s) and the bag are identical, and (d) The storage, handling and transportation records indicate that the blood, blood component, tissue, or derivatives have been inspected and that they are acceptable for reissue.

Blood products represent an expensive and labor-intensive resource, reportedly accounting for approximately 1% of hospital expenditures. Yet the transportation and storage of blood products is often an inefficient and costly process. This is due to the complexity of the supply chain: the series of refrigerated production, storage and distribution activities, equipment, and logistics required to maintain a desired low-temperature range.

As shown in FIG. 3 and according to the AABB and the World Health Organization (WHO), blood products must be maintained within a critical range of temperatures during a short timeframe to remain viable. The steps listed under "Condition" in FIG. 3 refer to the steps in the blood supply chain shown in FIG. 2.

These include five out of seven steps where delays, miscommunications, or procedural issues can cause blood products to go out of safe temperature range. This is also true for blood and blood components being returned to the blood bank or transfusion service.

Red blood cell (RBC) product wastage in hospitals is reported to range anywhere from 0.1% to 6.7%. In one study, approximately 87% of wasted RBC units were either individual units that were out of blood bank for more than 30 minutes (dispensed but not administered) or units packed in transport containers with temperature indicators affixed to each unit.

Factors identified as contributors to RBC wastage most amenable to improvement were lack of awareness and training of staff ordering and handling RBC products, management of temperature-validated containers, inconsistent interpretation of RBC temperature indicators, and need for accountability when ordering blood products.

The cost of blood wastage is significant. In the National Blood Collection Utilization Survey in 2011, the annual direct cost of intraoperative RBC wastage at one medical center was reported to have amounted to approximately $249,000 2010, based on a direct cost of $225 per unit of leuko-reduced RBCs, excluding costs associated with the procurement, management, storage, and issue of these products. In other reports, the comprehensive cost of a unit of transfused RBC can range between $1,800 to $3,000 per unit.

The present inventors have recognized the following shortcomings in the blood chain management equipment, systems, technologies, and procedures which are in current use. Cardboard boxes lined with foam insulation on the inside or molded plastic coolers such as a recreational storage boxes made by Igloo™ are the industry standard components employed for packaging and storage of temperature sensitive products in this blood transfusion supply chain. The many drawbacks recognized by the inventors to these existing blood chain management equipment, systems, technologies, and procedures, can be categorized as follows:

Inconsistent thermal properties leading to low quality or low effectiveness;

Lack of payload status monitoring and feedback to the end user;

No built-in feedback mechanism that can provide payload efficacy status;

Time-consuming and laborious compliance or validation processes; and

Excessive costs, including shipping.

Consumer-grade coolers, such as those manufactured by Igloo™, Rubbermaid™, etc., which are often used for internal transport within hospitals, are generally fabricated from high-density plastic lined with 1.5 to 3 inches of foam insulation, and then the interior of the cooler is filled with crushed ice, leaving only 20% to 30% of the interior volume usable for storage and transport of blood products. Most of these consumer-market coolers are not designed for precision insulating, so they have non-uniform temperature distribution with hot and cold zones within them. Whereas the manufacturers of these coolers are unaware of their potential use for life-saving purposes, the manufacturing of these coolers is potentially widely variable over time and production runs. The typical foam-lined cardboard box uses Styrofoam with just insulation rating of R3 to R4 per inch, or polyisocyanurate with R5 to R7 per inch. While these boxes are low-cost, they provide limited performance in demanding settings, such as longer transport times, or storage at the bedside of a patient who requires continuous lower-volume transfusions. Additionally, because different blood products require different temperature ranges for packaging, the insulation, cooling material, and pack-out of each blood product must be varied based on the type of blood product being packaged and transported, leading to unnecessary complexity in procedures as well as increased possibility of human error leading to damage of the blood product. Still further, the existing materials and procedures used by blood banks and hospitals have little flexibility to size up or down according to the requirements of each shipment. This adds even more inefficiencies and higher costs.

Finally, the present inventors have taken notice that many blood banks and hospitals today use an arbitrary collection of packaging materials that requires an extensive set of pack-out evaluations.

To solve these shortcomings, the present inventors set out to design and verify blood chain management equipment, technologies, and procedures which provide a pre-validated system of integrated packaging and components that are faster and simpler to evaluate, use, and comply with applicable standards and procedures.

Figure 4:
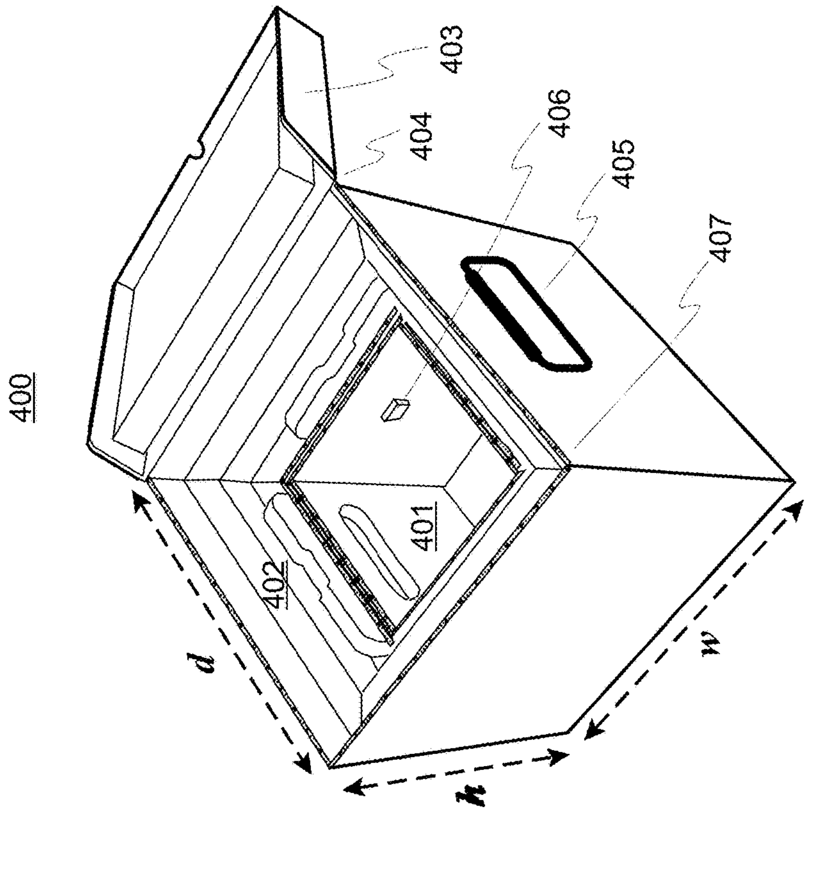
FIG. 4 provides a photograph of a prototype according to at least one embodiment of the present invention with the lid open, a payload carrier received into the interior of the container, and four cooling packs installed between the payload carrier and between the insulated walls of the container.

FIG. 4 illustrates an advanced blood transport container (400) from MaxQ Research LLC of Stillwater, Okla., in a condition with a top or lid (403) open, which has external dimensions of 13.25" for width w, height h and depth d. A payload carrier (401) has dimensions of 10" for width, height, and depth. The payload carrier is surrounded by one or more layers of corrugated plastic side panels, back panel, and front panel, with one or more layers of insulation material, and one or more layers of freezable packs (water, gel, phase change, etc.). A top (403) is attached to the rear panel by a thermoplastic hinge (404), and the top has a lip around the side edges and front edge which descends downward when closed to surround the top edge of the side panels and front panel. This particular transport container is also provided with a pair of handles (405) on the left and right sides for each of lifting and moving the loaded container. While this transport carrier will be used to illustrate one particular embodiment of the present invention, and while this particular structure itself is new and novel, other embodiments of the present invention may be realized with other transport and storage containers, such as those mentioned in the foregoing paragraphs.

Figure 5:
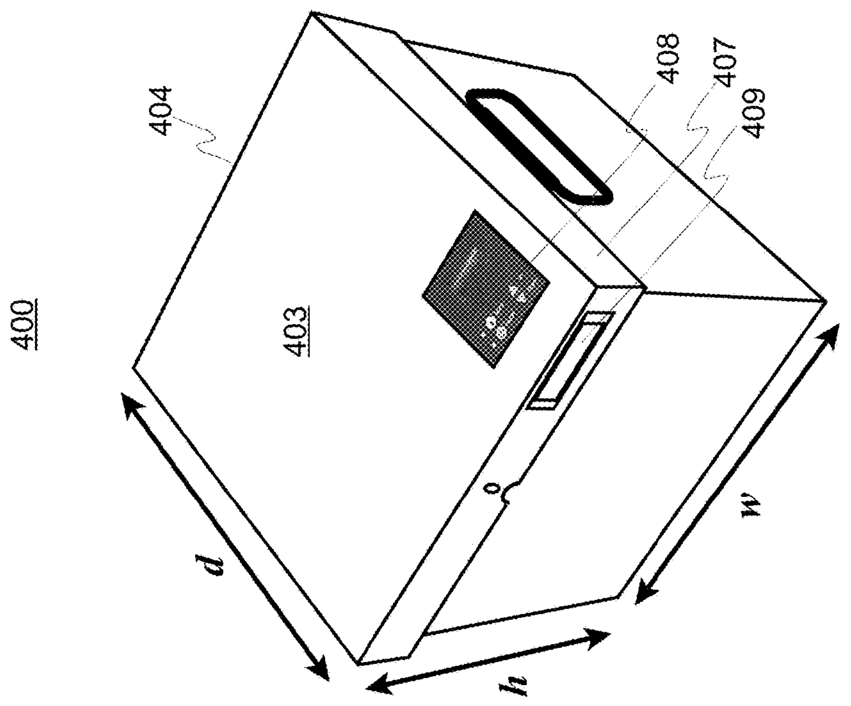
FIG. 5 provides a photograph of the same prototype of FIG. 4, with the lid closed, illustrating an exemplary location of the tracking module, user interface, and lid status sensor.

The present exemplary embodiment is realized by several improvements and modifications to the transport container (400), including the addition of at least one concealed magnet (407), preferably at the front right corner of the container. Further, the payload carrier (401) is improved to have at least one temperature sensor (406), and optionally other sensor types (humidity, pressure, shock, etc.), preferably at a position towards the geometric center of the rear panel of the payload carrier (401). And, as shown in FIG. 5 with the transport container (400) lid (403) in a closed position, a small electronic tracking module (408) with an optional user interface is disposed in the front right corner such that a Hall effect sensor within the module can sense the proximity of the magnet (407), thereby sensing closure of the lid (403). Additionally, in this exemplary embodiment, an access port (409) is provided through the lip of the lid to allow for connections such as a charging connector, a data connector, and a removable memory card.

Other placements of the tracking module, payload sensor, and closure sensor are available in other embodiments, as are other means for sensing closure of the lid, such as but not limited to near field communications (NFC), momentary switches, optical sensors, etc. This particular arrangement of placements has the advantage that no external cabling or wiring is necessary to connect the closure sensor to the tracking module, and the weight of the tracking module assists in pressing the lid downwards to provide a better thermal seal when a user casually flips the lid closed without making a deliberate effort to press the lid fully closed and/or to secure the lid's latch.

In this configuration, testing of a prototype confirms that the fully integrated wireless payload temperature monitoring system with a calibrated sensor location reduces user error and hot/cold measurement bias, with built-in memory capable of continuous recording of payload temperature, can generate a detailed payload temperature history report after every trip, can be validated for storing refrigerated blood products (RBC, plasma) for over 24 hours. This specific embodiment has a capacity of 1 to 8 units of blood products, can maintain the temperature of the payload between 1-6 degrees Centigrade (° C.) for 24 hours or more, and can accurately measure and record payload temperature using a National Institute of Standards and Technology (NIST) traceable temperature sensor (−40 to +125° C., accuracy of ±0.3° C., resolution of 0.01° C.). The continuous payload temperature recording allows for user defined recording intervals, preferably minimum 2 minutes, and the tracking module provides audible and visual temperature excursion alarms. The open/close sensor and record generator provides useful chain of custody records by time stamping of every lid open event.

In the tested prototype, a rechargeable LiPo battery lasted up to 2 weeks. And, an O-LED display provided status read out, payload temperature, payload status (acceptable or not acceptable) compared to predetermined payload-specific thresholds, and a battery level indicator. A removable secure digital (SD) memory card was capable of storing data for up to 1 month at 2 minute recording intervals. An application program running on a mobile computing device (Android™, iOS™, Windows™, etc.) could wirelessly interface to the tracking module using its on-board Bluetooth low energy (BLE) communication link, allowing for a full suite of mobile applications and data management, such as current payload status, snap shot graph or list of payload temperature history, and exporting payload temperature history.

Figure 6:
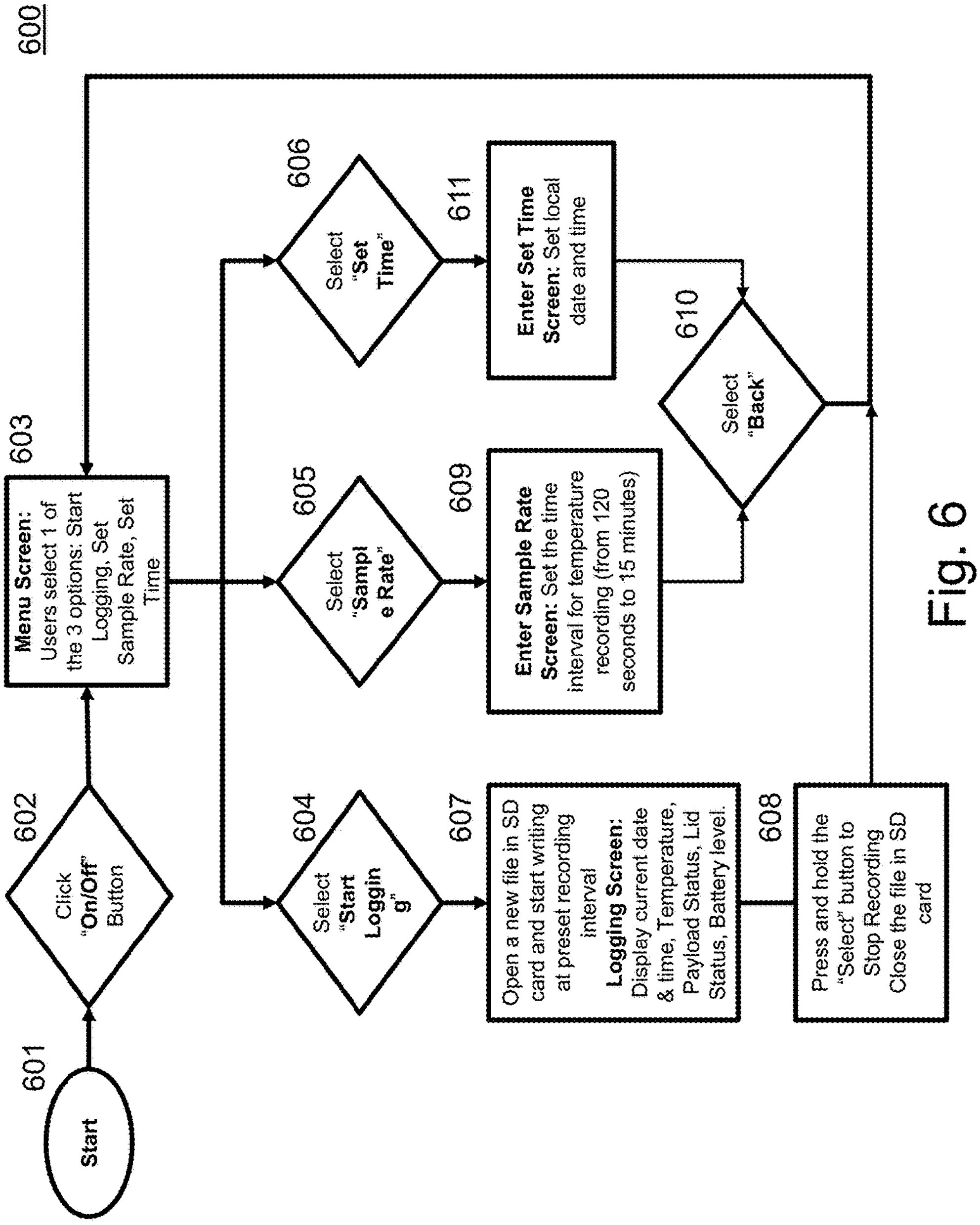
FIG. 6 shows an exemplary process for providing basic user interface functions and tracking the environmental conditions of the payload.

FIG. 6 sets forth an exemplary logical process (600) for the tracking module which can be executed by a processor with memory-stored firmware, by programmable logic circuitry, by custom logic circuitry, or by a combination of the foregoing electronic elements, to implement a user interface menu system. This particular embodiment starts (601) upon application of power from a power source (battery, solar cell, power adapter, etc.) and the clicking of an On/Off button (602) by the user to put the tracking module into a fully operational mode. Optionally, when the tracking module is in the "off" mode, it may be placed into a lower power mode in which some components and subsystems are placed in a sleep or dormant mode, while other components and subsystems are still in a functioning mode, such as a wireless interface or a timer-interrupt circuit.

Upon clicking the On button, a menu screen is displayed (603), which allows the user to start a new logging session (604), to adjust the sample rate or interval (605), or to set the system time (606). If the option to start a new logging session is selected, a new data file is opened (607), and the display is updated to remove the menu and show relevant real-time information, such as the system time, the temperature reading(s) of the sensor(s), the status of the payload (acceptable/not acceptable), the battery level, the lid status (open/close), the elapsed time, other optional sensor and interface statuses (shock sensor, humidity level, GPS status, Wi-Fi connection mode, BLE mode, etc.). Logging into the open file and updating of the menu may continue until the "select" button is pressed and held for a minimum period of time, at which time, logging is completed, and the file is closed and finalized. To conserve battery power, and depending on the display type, the display may be blanked, cleared, or turned off after a period of inactivity at the user interface buttons, and then re-enabled when any button is pressed, the lid is opened, the payload status becomes unacceptable or nearly unacceptable, etc.

If, at the main menu (603) the user selects the option to set the sample rate or interval (605), the display is updated to allow the user to enter a sample rate or interval, such as by scrolling up and down through values and hitting select. Optionally, the minimum sample rate (samples per second) or maximum sample interval (seconds between samples) can be enforced according to a predetermined value recorded in system memory according to the type of payload being conveyed, to prevent the user from selecting a value which is not compliant with a relevant handling and storage standard or requirement value. The user can return (610) to the main menu (603) when finished setting this value.

If, at the main menu (603) the user selects the option to set the system time (606), the display is updated to allow the user to enter time and date values, or to select an automatically-determined time value such as a time received from a Global Positioning System (GPS), application running on a nearby paired mobile computing device, etc. Optionally, if the tracking module is currently logging (607) sensor values and events, the user may be prohibited from changing the system time, or the system may record an event into the log of the current time before changing the system clock and the value set by the user after the change for traceability and for meeting of standards regarding maximum time in transit for a particular type of product being conveyed.

Figure 9:
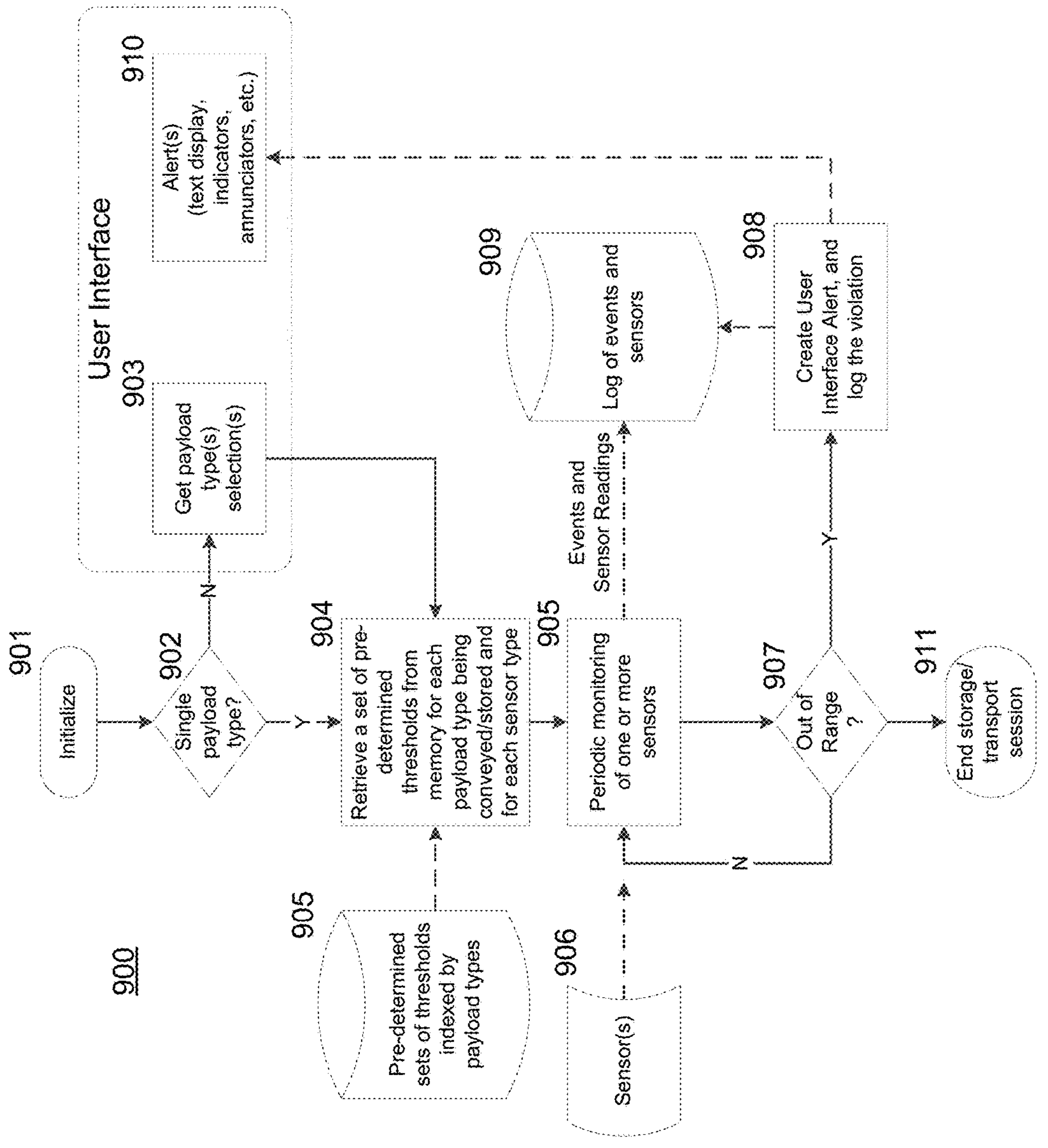
FIG. 9 illustrates an exemplary process for monitoring one or more sensors and providing logging and alerting for payloads which have been subjected to conditions which may cause their condition to be unacceptable.

FIG. 9 sets forth an exemplary logical process (900) for the tracking module which can be executed by a processor with memory-stored firmware, by programmable logic circuitry, by custom logic circuitry, or by a combination of the foregoing electronic elements, to implement a real-time monitoring of one or more sensor types for at least one type of payload, and optionally, for a variety of payload types. After initialization (901), a check (902) may be made to see if this particular embodiment supports two or more payload types. Some embodiments may be restricted to a single payload type, and if so, those embodiments would go directly to retrieving (904) the pre-determined thresholds (905) for at least one sensor type (e.g., temperature), and optionally, multiple sensor types (e.g., additional temperature sensors, shock sensors, access panel open/close sensors, etc.).

Each sensor (906) is sampled (905) periodically, potentially on different periods or rates for different sensor locations and types. Each sensor reading and detected event is added to the open log memory file (909). If any sensor reading is detected (907) to be out of acceptable range (905) corresponding to the sensor location, sensor type, and payload type, then an alert such as a flashing LED, text string on a display and/or annunciator (buzzer, etc.) is activated (910), and the condition is logged (909). This monitoring (905, 907), logging (909) and alerting (910) continues until the storage or transportation of the payload is complete (911).

Figure 1:
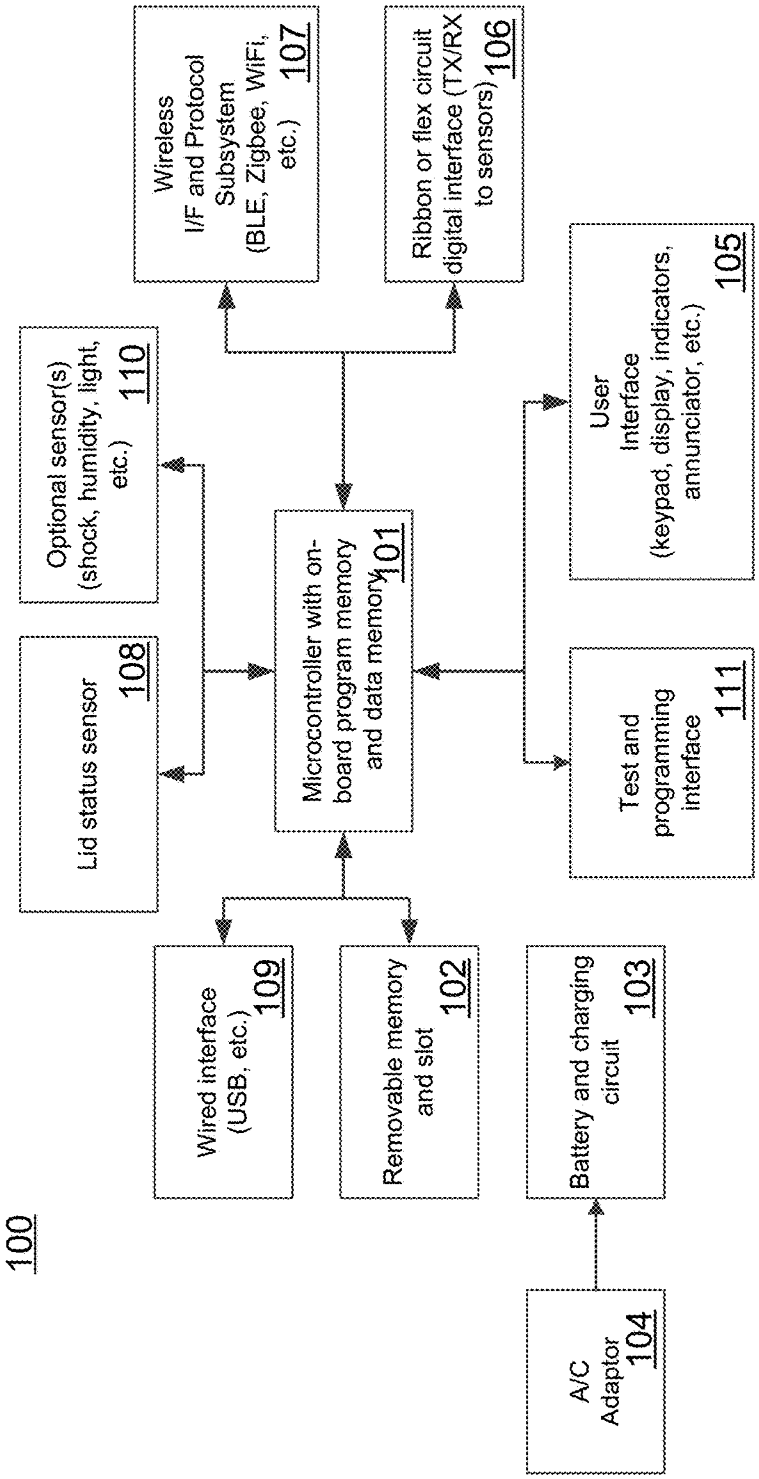
FIG. 1 illustrates a functional block diagram of a tracking module according to at least one exemplary embodiment of the present invention.

FIG. 1 illustrates a block diagram of an exemplary embodiment (100) according to the present invention of the circuitry for the tracking module. The present inventors recommend, and used in a tested prototype, a low-power microcontroller (101) which has on-board program memory and local data memory, and which can be programmed, controlled, and/or debugged via a test connector (111). Such microprocessors typically have on-board or built-in clocks, calendars, sleep timers, and sometimes, serial communications interfaces. Other embodiments may use less integrated processor architectures, of course. Power for the tracking module, as built and tested, included an integrated battery (103), which was rechargeable via an A/C adaptor (104), and which provided a battery status indicator directly from the charging circuit (103) to the microcontroller (101). Other embodiments may include a removable battery, solar cell power source, solar charging circuit, and inductive charging circuits.

A wireless interface (107) in the prototype included a Bluetooth Low Energy (BLE) interface, and in other embodiments, may include networking interfaces (WiFi, Cellular, etc.), other short-range wireless interfaces (Zigbee™, InfraRed Data Arrangement (IrDA), etc.), as well as wired interfaces (109) (Universal Serial Bus (USB), Ethernet, etc.). These communications interfaces allow for the tracking module to communicate with application programs running on nearby mobile computing devices (smart phones, tablet and laptop computers, etc.) as well as with server computers (cloud servers, Internet-of-Things (IOT) servers, etc.). Such application programs may collect the logged data on real-time status, locally or remotely, and may coordinate and facilitate additional business and technical functions, such as supply chain tracking, inventory management, etc.

The lid status sensor (108), such as a Hall-effect sensor mechanically positioned near the magnet embedded in the upper edge of the container, may send its status to the microcontroller (101) to allow the process to detect and time the openings and closings of the lid, to create records of such in the log on the removable memory card, and to cause alerts to be seen and heard via the user interface (105), as previously discussed, if the lid remains open too long, the payload status is nearing or has reached unacceptable levels, etc.

The user interface (105) is further used to receive user input and commands, such as those previously discussed with respect to FIG. 6, and to provide real-time sensor and status information to the user (temperatures, time in transit/storage, lid status, battery level, etc.) as well as to cause alerting when the process has detected the payload is near or has exceeded acceptable limits.

The tracking module is further provided with payload-specific predetermined storage and handling limits, such as those shown in FIG. 3. In some embodiments, the tracking module may be programmed with a single set of storage and handling limits for a single payload type, and the container may be marked or otherwise color coded to indicate that it is only appropriate for storing and transporting that single payload type, such as "Whole Blood and Packed Red Cells ONLY." In other embodiments, the user may be provided a menu or the connected application program which may allow for the selection of one of several sets of storage and handling limits, which are stored in the tracking module's memory, based upon the type of payload to be conveyed in the current shipment. The payload status is then generated by the processor and process based on the logged conditions (temperature, time in transit, shock, lid status, etc.) for the specific payload type being conveyed, and the appropriate alarms are issued to the user corresponding to the specific set of limits for the specific payload.

Figure 7:
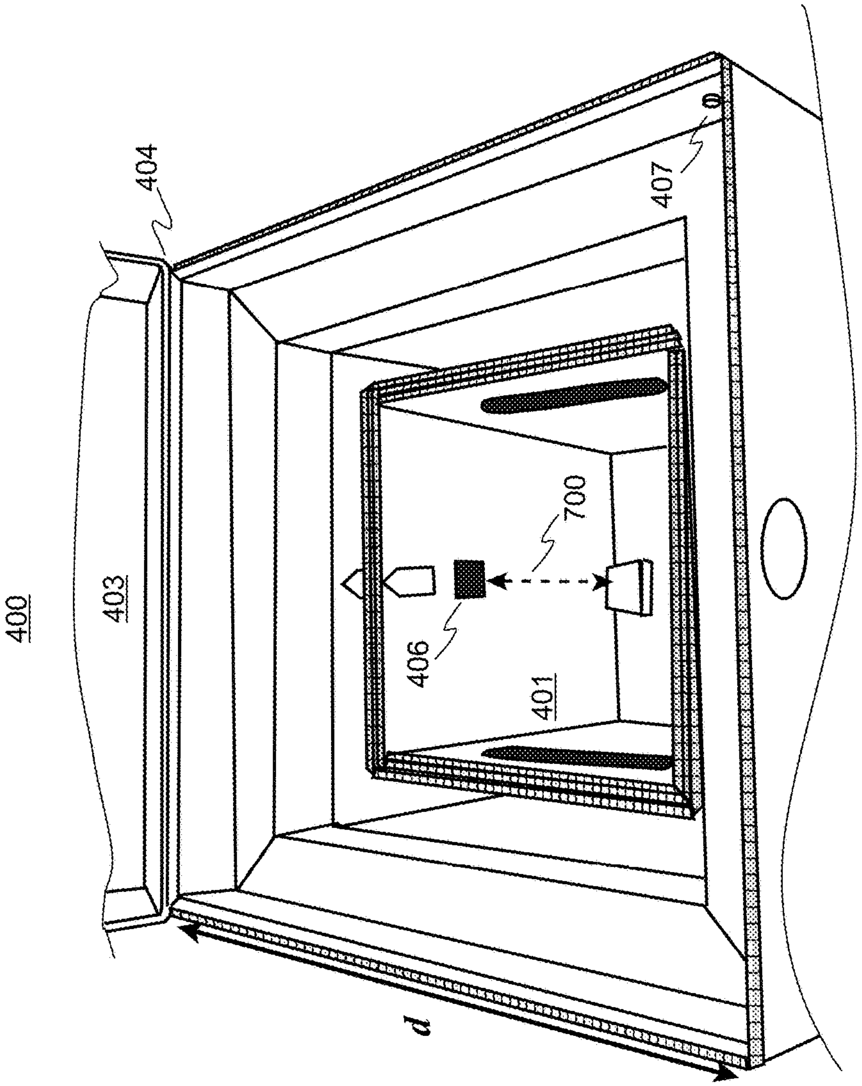
FIG. 7 illustrates sensor placement in the payload carrier of the prototype of FIG. 4.

A particularly useful aspect of the prototype tested was a quick disconnect for the temperature sensor in the payload carrier to the tracking module. Rather than require the user to place the sensor within the payload, or require the user to connect cables or wires for the sensor, the sensor was affixed to a position (406) essentially in the center of the back panel of the removable payload carrier (401). In this particular embodiment, the optimal sensor location was determined based on thermal mapping of the container through mathematical models and validation through actual test results. The sensor used was of a type that had an integrated sensor, analog-to-digital converter, and digital communication path drivers in a single component such that a flat flex cable carrying sensor data values (samples) could be embedded in the back panel of the removable payload carrier (shown by dotted path 700 in FIG. 7). As the flat flex circuit (or ribbon cable) reached the bottom of the back panel of the payload carrier, it was wrapped around the corner and connected to a first part of a multi-contact connector that consisted of spring-loaded pins. In other embodiments, the sensor may be provided with a wireless interface device, such as a near-field communication (NFC), Bluetooth Low-Energy (BLE)™ or Zigbee™ interface.

Figure 8:
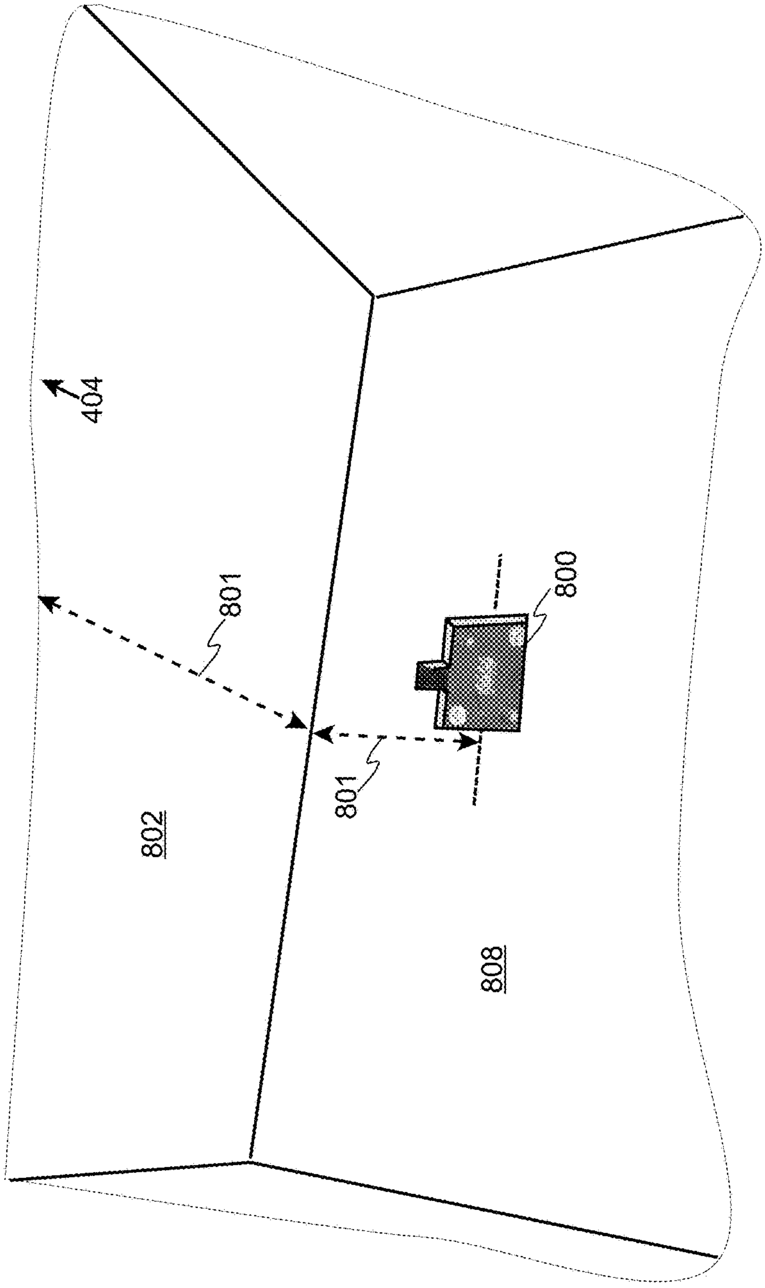
FIG. 8 illustrates the receiving mate for the quick disconnect/connect arrangement for the sensor signal to the tracking module.

In a corresponding recess (800) formed in the bottom (808) of the interior of the container, a mating connector was placed such that the connector on the bottom of the payload carrier would automatically orient and align with it as the payload carrier is lowered into the container, making electrical connection between the two as forced by the weight of the payload carrier and payload. Then, from that receiving connector, another flex cable was routed (801) across the bottom of the container, up the rear wall of the container to the lid hinge (404), as shown in FIG. 8, then around the hinge and along the bottom side of the lid (403) towards the tracking module, where it was terminated into the circuits of the tracking module. In the tested prototype, the mating connectors were provided with attracting magnetic components to further ensure strong mechanical connection between each pin and socket set.

Referring again to FIG. 5, the improved container (400) is shown with the lid (403) closed and the user interface of the tracking module (408) shown affixed or mounted in the corresponding corner near the magnet (407) disposed in the upper front edge of the container for the lid status detector.

In other embodiments, the sensor embedded in the payload carrier may connect using other means, such as optical (e.g., InfraRed Data Arrangement (IrDA)), wireless transmission, or a wired-through-connector configuration.

In still other embodiments, the container system may be provided with additional temperature sensors at additional locations for further confirmation of temperature management; a weight gate sensor which actively monitors and records the amount of payload placed inside and removed the container to detect potential tampering, theft, and changes in thermal load; shock and accelerometer(s) to detect when the payload may have been subjected to potentially damaging impacts; magnetometers; gyroscope; and hygrometers to help generate records which would indicate if the container system was maintained in its proper orientation for the entire period of storage or transportation. In most embodiments, the records created in the log may be time stamped and may optionally be marked with geographic positioning information, if equipped with a GPS subsystem.

In other embodiments, hand-offs from one courier to another may be recorded at the user interface, such as by entering a custodian code, scanning a barcode, or reading a Radio Frequency Identification (RFID) device outside the container system to create records of the chain of custody.

CONCLUSION

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A shipping and storage system for transporting a first payload type as a blood product comprising:

a removable payload carrier;

a container having at least one access panel for inserting or removing the removable payload carrier;

a first sensor affixed at a pre-determined position proximal to an interior payload volume of the container, wherein the pre-determined position comprises an element of a pre-validated system of integrated packaging and components for a first payload type and specific passive temperature maintenance of the first payload type, and the pre-validated system of integrated packaging and components being previously validated against a pre-determined performance standard for a specific payload type;

a tracking module affixed to the container, receiving at least one signal from the first sensor, having at least a first set of memory-stored predetermined thresholds corresponding to the first payload type, and having a comparator for comparing the first sensor received signal to the first set of memory-stored predetermined thresholds, wherein the memory-stored pre-determined thresholds comprise elements of the pre-validated system, wherein each of the memory-stored predetermined thresholds corresponds to a specific payload type being conveyed in the removable payload carrier and a sensor type affixed at a corresponding position proximal to the interior payload volume;

a sensor interconnect which provides communication between the first sensor and the tracking module without requiring user manipulation of a physical connector; and a user alert output on a user interface device of the tracking module for indicating that the comparator has detected the first set of the memory-stored pre-determined thresholds has been violated based on the first sensor received signal.

2. The shipping and storage system as set forth in claim 1 wherein the container comprises a shipping container.

3. The shipping and storage system as set forth in claim 1 wherein the container comprises a storage container.

4. The shipping and storage system as set forth in claim 1 wherein the first sensor received signal comprises signal received from the group consisting a temperature sensor, an accelerometer, a hygrometer, a shock sensor, a magnetometer, and an access panel open/close status sensor.

5. The shipping and storage system as set forth in claim 1 wherein the first set of the memory-stored pre-determined thresholds comprises a set of temperature storage thresholds for a blood product payload type of the first payload type.

6. The shipping and storage system as set forth in claim 5 wherein the blood product payload type consists of a payload type selected from the group consisting of whole blood for transport, whole blood for storage, platelet concentrates for transport, platelet concentrates for storage, fresh frozen plasma for transport, fresh frozen plasma for storage, packed red cells for transfusion, and thawed plasma for transfusion.

7. The shipping and storage system as set forth in claim 1 wherein the first sensor comprises a wireless temperature module, and wherein the sensor interconnect comprises a short-range wireless interface.

8. The shipping and storage system as set forth in claim 1 wherein the sensor interconnect comprises a spring-loaded electrical contact.

9. The shipping and storage as system set forth in claim 1 wherein the memory-stored pre-determined thresholds correspond to one or more threshold values selected from the group consisting of temperature, humidity, weight, acceleration, deceleration, light, maximum sample period, minimum sample rate, accrued time in storage, accrued time in transit, a maximum access panel open time, and a maximum number of access panel openings before declaring a tampered payload.

10. The shipping and storage system as set forth in claim 1 wherein the tracking module further comprises a plurality of second through n-th sets of memory-stored pre-determined thresholds corresponding to second through n-th different payload types, and the pre-validated system of integrated packaging and components being further previously validated against a second through n-th predetermined performance standards for a specific payload type corresponding to the second through n-th payload types.

11. The shipping and storage system as set forth in claim 1 wherein the tracking module further comprises the user interface device for allowing a user to receive one or more tracking module outputs selected from the group consisting of a real-time temperature, a real-time clock, an accrued time in storage value, an accrued time in transit value, a payload condition status, a battery level indicator, an alarm annunciator, a access panel status, a access panel open event count, a tamper detection status, and a connectivity status indicator.

12. The shipping and storage system as set forth in claim 1 wherein the tracking module further comprises the user interface device for allowing a user to establish one or more tracking module operational modes of the tracking module selected from the group consisting of setting a real-time clock, starting a tracking session, stopping a tracking session, selecting a payload type, set a sample period, and set a sample rate.

13. The shipping and storage system as set forth in claim 1 wherein the tracking module further comprises a removable memory device which encodes one or more records created by the tracking module regarding sensor signals and detected events.

14. The shipping and storage system as set forth in claim 1 wherein the tracking module further comprises a communications interface for allowing the tracking module to communicate to a separate computing device.

15. The shipping and storage system as set forth in claim 14 wherein the communications interface comprises at least one interface selected from the group consisting of a Bluetooth interface, a Wi-Fi interface, a Zigbee interface, a Universal Serial Bus interface, an Ethernet interface, and a test bus.

16. The shipping and storage system as set forth in claim 1 wherein the at least one access panel comprises a hinged top lid.

17. The shipping and storage as set forth in claim 1 further comprises an access panel status sensor, wherein the access panel status sensor comprises a magnet and a Hall-effect sensor.

18. A method of tracking and monitoring a status of a first payload type as a blood product conveyed in a shipping container system comprising:

affixing a first sensor at a pre-determined position proximal to an interior payload volume of a removable payload carrier of the shipping container system, wherein the removable payload carrier is removably receivable into an interior of a thermally insulated container of the shipping container, wherein the pre-determined position comprises an element of a pre-validated system of integrated packaging and components for the first payload type and specific passive temperature maintenance of the first payload type, and wherein a sensor interconnect provides communication between the first sensor and a tracking module without requiring user manipulation of a physical connector, and the pre-validated system of integrated packaging and components being previously validated against a predetermined performance standard for a specific payload type;

affixing the tracking module to the thermally insulated container;

receiving, by the tracking module, at least one signal from the first sensor;

comparing, by the tracking module, in real-time, at least a first set of memory-stored pre-determined thresholds corresponding to the first payload type to the at least one signal, wherein the memory-stored pre-determined thresholds comprise elements of the pre-validated system, and each of the memory-stored predetermined thresholds corresponds to a specific payload type being conveyed in the removable payload carrier and a sensor type affixed at a corresponding position proximal to the interior payload volume; and responsive to a result of said comparing indicating a violation of a payload handling condition for the first payload type, outputting, by the tracking module, a corresponding user alert on a user interface device connected to the tracking module.

19. The method as set forth in claim 18 wherein the at least one signal from the first sensor comprises a signal selected from the group consisting of a wired temperature sensor, a wireless temperature sensor, an accelerometer, a hygrometer, a shock sensor, a magnetometer, and an access panel open/close status sensor.

20. The method as set forth in claim 18 wherein the first payload type consists of at least one payload type selected from the group consisting of whole blood for transport, whole blood for storage, platelet concentrates for transport, platelet concentrates for storage, fresh frozen plasma for transport, fresh frozen plasma for storage, packed red cells for transfusion, and thawed plasma for transfusion.

21. The method as set forth in claim 18 wherein the memory-stored pre-determined thresholds correspond to one or more threshold values selected from the group consisting of temperature, humidity, weight, acceleration, deceleration, light, maximum sample period, minimum sample rate, accrued time in storage, accrued time in transit, a maximum access panel open time, and a maximum number of access panel openings before declaring a tampered payload.

22. The method as set forth in claim 18 wherein the tracking module further comprises a plurality of second through n-th sets of memory-stored pre-determined thresholds corresponding to second through n-th different payload types, and the pre-validated system of integrated packaging and components being further previously validated against a second through n-th predetermined performance standards for a specific payload type corresponding to the second through n-th payload types.

23. The method as set forth in claim 18 further comprising providing to the user interface device one or more tracking module outputs selected from the group consisting of a real-time temperature, a real-time clock, an accrued time in storage value, an accrued time in transit value, a payload condition status, a battery level indicator, an alarm annunciator, a access panel status, a access panel open event count, a tamper detection status, and a connectivity status indicator.

24. The method as set forth in claim 18 further comprising providing the user interface device for allowing a user to establish one or more tracking module operational modes of the tracking module selected from the group consisting of setting a real-time clock, starting a tracking session, stopping a tracking session, selecting a payload type, set a sample period, and set a sample rate.

25. The method as set forth in claim 18 further comprising encoding to a removable memory device connected to the tracking module one or more records regarding sensor signals and detected events.

26. A system for tracking and monitoring a status of a first payload type as a blood product conveyed in a shipping container system comprising:

a processor of a tracking module for executing program instructions;

a non-transitory computer-readable memory device; and one or more program instructions encoded by the non-transitory computer-readable memory device for causing the processor, when executed, to perform operations of:

receiving, by the tracking module, at least one signal from at least a first sensor, wherein a payload carrier is removably receivable into an interior of a thermally insulated container of the shipping container system, wherein the first sensor is affixed at a pre-determined position proximal to an interior payload volume of the payload carrier, wherein the pre-determined position comprises an element of a pre-validated system of integrated packaging and components for the first payload type and specific passive temperature maintenance of the first payload type, wherein the at least one signal is received via a sensor interconnect which provides communication between the first sensor and the tracking module without requiring user manipulation of a physical connector; wherein the tracking module is affixed to the thermally insulated container, and the pre-validated system of integrated packaging and components being previously validated against a predetermined performance standard for a specific payload type;

comparing, by the tracking module, in real-time, at least a first set of one or more memory-stored predetermined thresholds corresponding to the first payload type to the at least one signal, wherein the pre-determined thresholds comprise elements of the pre-validated system; and each of the memory-stored predetermined thresholds corresponds to a specific payload type being conveyed in the payload carrier and a sensor type affixed at a corresponding position proximal to the interior payload volume; and responsive to a result of said comparing indicating a violation of a payload handling condition for the first payload type, outputting, by the tracking module, a corresponding user alert on a user interface device connected to the tracking module.

27. The system as set forth in claim 26 wherein the at least one signal from the first sensor comprises a signal selected from the group consisting of a wired temperature sensor, a wireless temperature sensor, an accelerometer, a hygrometer, a shock sensor, a magnetometer, and an access panel open/close status sensor.

28. The system as set forth in claim 26 wherein the first payload type consists of at least one payload type selected from the group consisting of whole blood for transport, whole blood for storage, platelet concentrates for transport, platelet concentrates for storage, fresh frozen plasma for transport, fresh frozen plasma for storage, packed red cells for transfusion, and thawed plasma for transfusion.

29. The system as set forth in claim 26 wherein the memory-stored pre-determined thresholds correspond to one or more threshold values selected from the group consisting of temperature, humidity, weight, acceleration, deceleration, light, maximum sample period, minimum sample rate, accrued time in storage, accrued time in transit, a maximum access panel open time, and a maximum number of access panel openings before declaring a tampered payload.

30. The system as set forth in claim 26 wherein the memory-stored pre-determined thresholds further comprise a plurality of second through n-th sets of memory-stored pre-determined thresholds corresponding to second through n-th different payload types, and the pre-validated system of integrated packaging and components being further previously validated against a second through n-th predetermined performance standards for a specific payload type corresponding to the second through n-th payload types.

31. The system as set forth in claim 26 wherein the program instructions further comprise operations to provide to the user interface device one or more tracking module outputs selected from the group consisting of a real-time temperature, a real-time clock, an accrued time in storage value, an accrued time in transit value, a payload condition status, a battery level indicator, an alarm annunciator, a access panel status, a access panel open event count, a tamper detection status, and a connectivity status indicator.

32. The system as set forth in claim 26 wherein the program instructions further comprise operations to provide the user interface device for allowing a user to establish one or more tracking module operational modes of the tracking module selected from the group consisting of setting a real-time clock, starting a tracking session, stopping a tracking session, selecting a payload type, set a sample period, and set a sample rate.

33. The system as set forth in claim 26 further comprising program instructions to encode one or more records regarding sensor signals and detected events to a removable memory device connected to the tracking module.

* * * * *